Aug. 24, 1926. 1,597,659
L. A. HOERR
FASTENING FOR AIR BRAKE PRESSURE VALVES
Filed Oct. 10, 1925 2 Sheets-Sheet 1
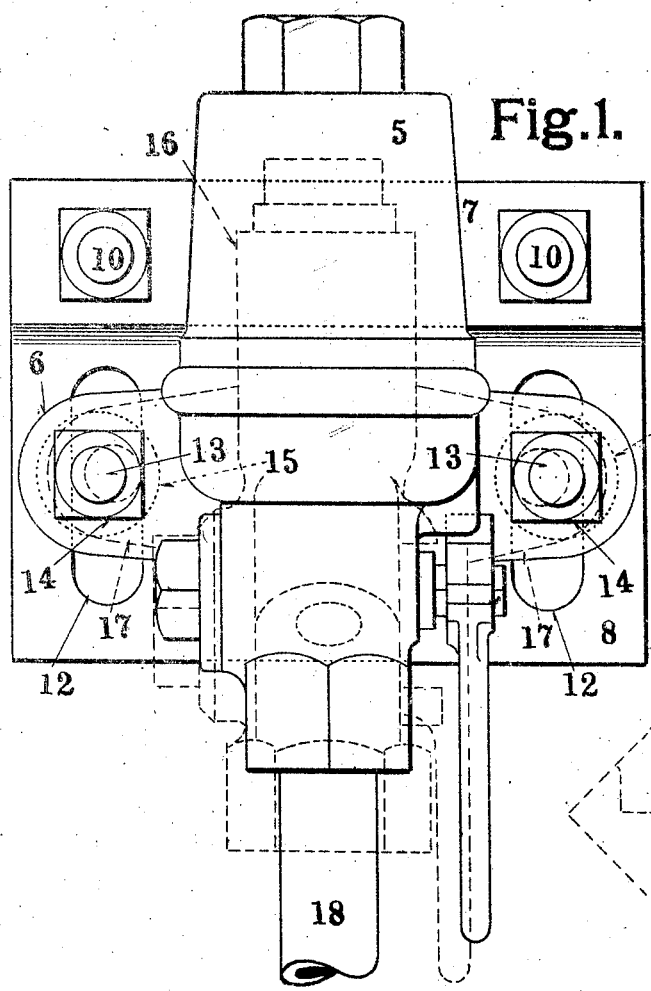
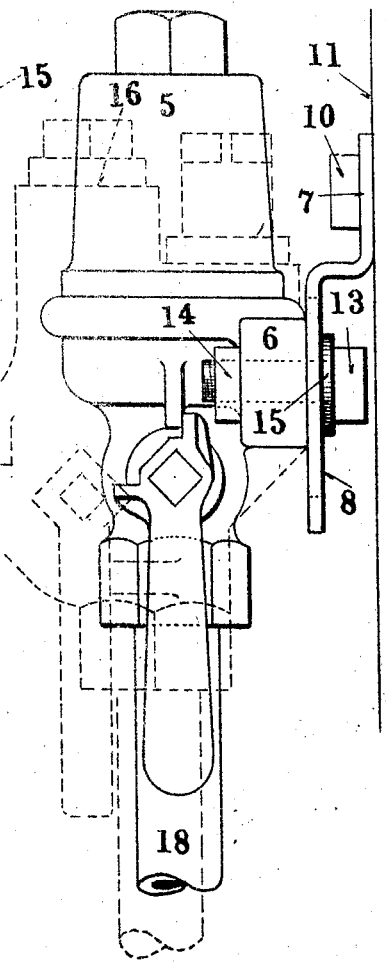
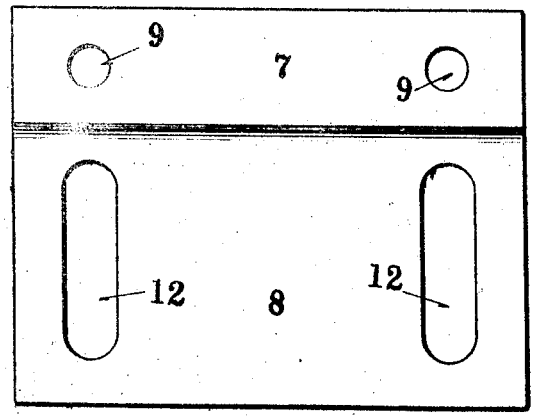
INVENTOR
L. A. HOERR
BY
ATTORNEY Aug. 24, 1926.
L. A. HOERR
1,597,659
FASTENING FOR AIR BRAKE PRESSURE VALVES
Filed Oct. 10, 1925    2 Sheets-Sheet 2
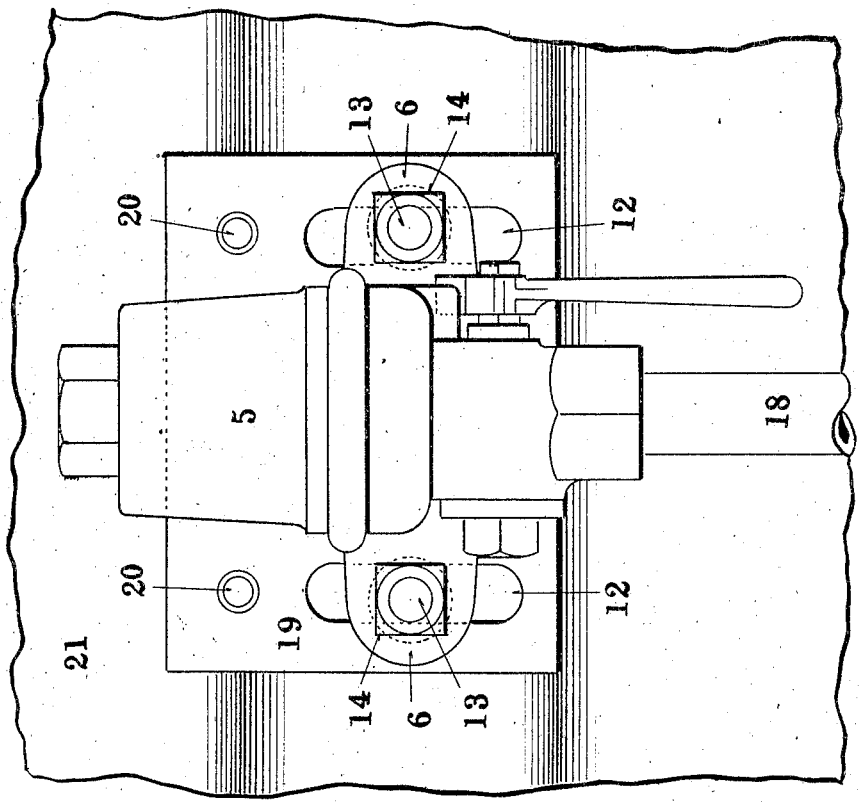
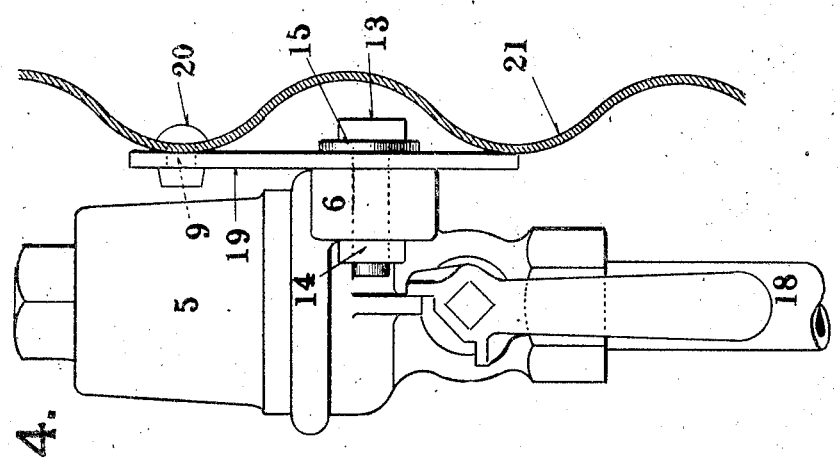
INVENTOR
L.A. HOERR
BY
ATTORNEY Patented Aug. 24, 1926.

1,597,659

UNITED STATES PATENT OFFICE.

LOUIS A. HOERR, OF ST. LOUIS, MISSOURI, ASSIGNOR TO RAILWAY DEVICES COMPANY, OF ST. LOUIS, MISSOURI, A CORPORATION OF MISSOURI.

FASTENING FOR AIR-BRAKE PRESSURE VALVES.

Application filed October 10, 1925. Serial No. 61,824.

My invention relates to a fastening for air brake pressure valves, and particularly to such a fastening in the form of a bracket adapted to be secured to the end of a railway car. The object of my invention is to provide a simple and effective device of this class which will accommodate valves in which the distance between the lug holes varies appreciably and which will also allow of the necessary vertical adjustment of the valve.

In the accompanying drawings, which illustrate two forms of fastening device made in accordance with my invention, Figure 1 is a front elevation showing the device in position on a railway car; Figure 2 is a side elevation; Figure 3 is a detail view of the supporting plate alone; Figure 4 is a side view showing a modification; and Figure 5 is a front view of the form shown in Figure 4.

Indicated in full lines is one type of pressure valve 5 provided with the usual lugs 6 having formed therein bolt holes for securing the device in position on the end of a car. The supporting plate is formed of a single piece of sheet metal bent to form two parts, 7 and 8 respectively, lying in different planes. Formed in the part 7 are a pair of holes 9 through which pass bolts 10 or other fastening means by which the said part 7 is secured against the end of a car 11. The part 8 is provided with a pair of vertical slots 12 for the reception of bolts 13 adapted to engage the holes in the valve lugs 6 which are clamped in position against the part 8 by nuts 14 on the bolts. These slots 12 are of greater width than the diameter of the bolts 13 so as to accommodate valves of various types having different distances between the holes in the lugs. On this account it is necessary to place washers 15 around the bolts behind the plate 8.

In Figures 1 and 2 of the drawings I have shown in full lines a type of valve 5 having maximum distance between the holes in the lugs 6, and in broken lines a type of valve 16 having minimum distance between the holes in the lugs 17. The width of the slots thus adapts the device to different types of valve, while the length of the slots compensates for the varying height of the valves caused by varying engagement of the same with the air pipe 18 to which it is attached, or any other reason.

Figures 4 and 5 illustrate a modification adapted to be used in connection with cars having corrugated ends. In this modification the supporting plate 19 lies in a single plane but is otherwise similar to the supporting plate above described being provided with holes 9 for rivets 20 to secure it to the corrugated end 21 of the car, and with slots 12 to receive the bolts 13. It will be seen that in this construction space for the heads of the bolts 13 is secured by the bending of the car end away from the supporting plate rather than by the bending of the plate away from the end as in the form first described.

Having fully described my invention, what I claim as new and desire to secure by Letters Patent of the United States is:

1. A device of the class described comprising a supporting plate adapted to be secured to a car end, said plate and car end being separated by bending to form a bolt pocket, said supporting plate being provided with means for attaching a pressure valve thereto, said means being arranged to accommodate varying bolt hole relations in the valve lugs and to permit vertical adjustment of the valve.

2. A device of the class described comprising a supporting plate adapted to be secured to a car end, said plate and car end being separated by bending to form a bolt pocket, said supporting plate being provided with a pair of closed vertical slots, and bolts passing through said slots and securing a pressure valve in position, the width of said slots being sufficient to accommodate valves having varying distances between their lug holes.

In testimony whereof, I hereunto affix my signature, this 6th day of October, 1925.

LOUIS A. HOERR.